Sept. 3, 1946.    H. T. SPARROW    2,407,184
SOLENOID VALVE
Filed Oct. 14, 1942
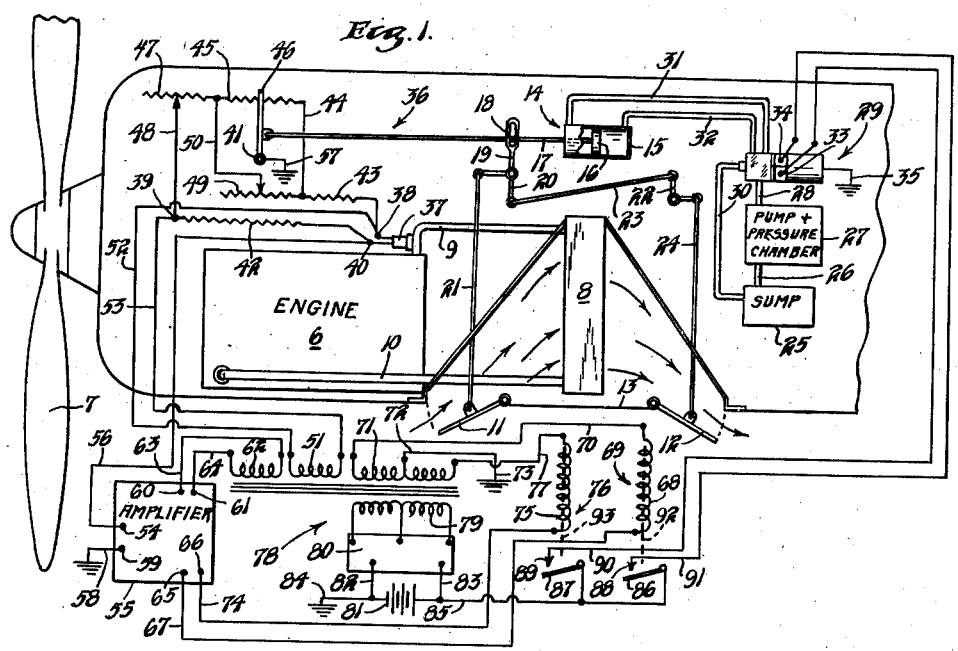
Fig. 1.
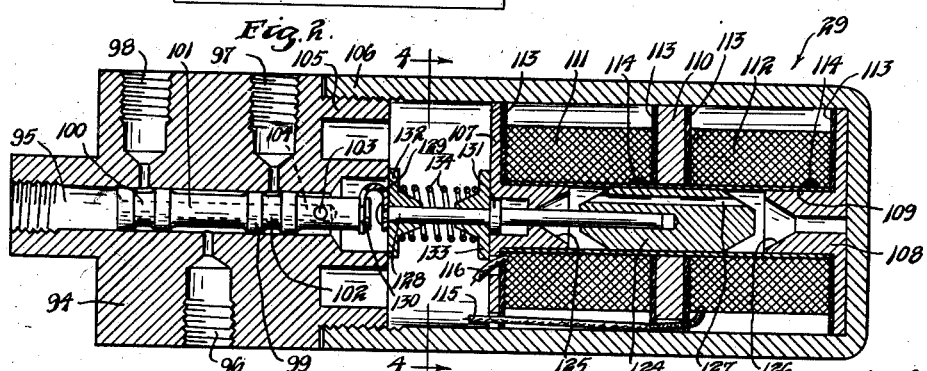
Fig. 2.
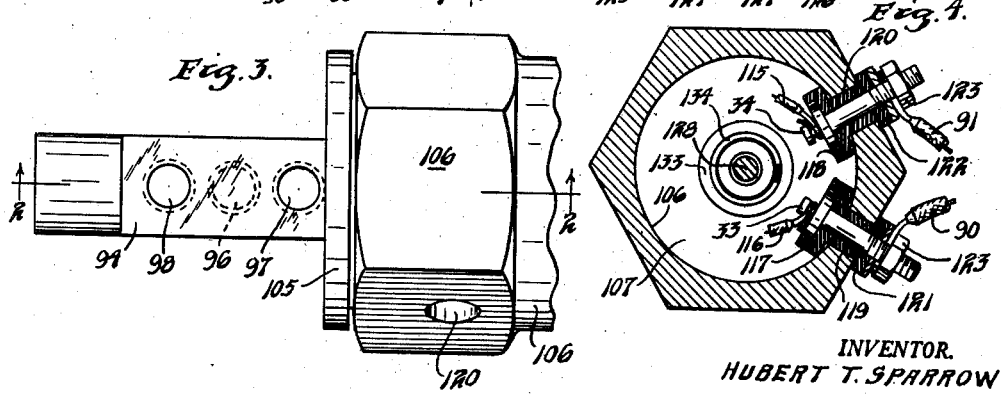
Fig. 3.
Fig. 4.
INVENTOR.
HUBERT T. SPARROW
BY
George H. Fisher
ATTORNEY Patented Sept. 3, 1946

2,407,184

UNITED STATES PATENT OFFICE 2,407,184

SOLENOID VALVE

Hubert T. Sparrow, Minneapolis, Minn., assignor to Minneapolis-Honeywell Regulator Company, Milwaukee, Wis., a corporation of Delaware Application October 14, 1942, Serial No. 461,956

5 Claims. (Cl. 137—139)

This invention relates to condition control apparatus generally but more particularly to novel improvements in the structure of solenoid valves, as applicable, for example, to temperature control systems for aircraft.

In certain types of aircraft scoops are provided for directing a flow of air to be used for cooling purposes. For example, in the case of aircraft employing liquid-cooled engines, the scoops direct a flow of air through the radiator of the cooling system. The amount of cooling is controlled by adjusting the scoops which are pivotally mounted so as to project from the sides of the aircraft in which position exceedingly high pressures are exerted upon the scoops. Accordingly, it is imperative that the means for adjusting the scoops be capable of maintaining the same in an adjusted position in order that a substantially constant engine temperature may be maintained. Moreover, it is further desirable that the adjusting means be susceptible of fine adjustment in order that the scoops may be positioned in accordance with small temperature variations, thereby providing a sensitive control system.

In the co-pending application of Willis H. Gille, Serial No. 439,673, filed April 20, 1942, a temperature control system for aircraft is disclosed in which an electric motor actuates a poppet valve through a plurality of cam means. The valve controls the flow of fluid under pressure to a reversible hydraulic servo-motor which in turn motivates the temperature control flaps.

The present invention contemplates valve means adapted for use in a temperature control system for aircraft in which a solenoid actuated piston valve controls the flow of fluid under pressure to a reversible hydraulic servo-motor which in turn motivates the scoops of the aircraft. The piston valve which may be inexpensively manufactured and reasonably leakproof in operation provides a simple and effective means for controlling the fluid flow and efficiently serves to hydraulically lock the scoops in an adjusted position as well. Furthermore, the solenoid means provides an expeditious, reliable, and inexpensive means for actuating the piston valve.

An object of this invention is to provide improved valve control apparatus which is particularly adaptable for use in aircraft control systems.

A further object of the present invention is to provide a unitary solenoid and piston valve structure which may be of rugged construction, inexpensively manufactured, readily assembled, and effective and reliable in operation.

A still further object is to provide a solenoid piston valve structure in which the valve piston and the solenoid plunger are coupled to each other in such a manner that the solenoid and valve may readily be assembled and disassembled and the plunger and piston are each free to slide in its own support independently of the other.

Still other objects are those expressly stated or implied in the following specification and claims reference being had to the accompanying drawing, in which:

Figure 1 illustrates diagrammatically the application of my invention to an aircraft engine temperature control system, Figure 2 is a sectional elevational view of the solenoid piston valve structure as viewed along the lines 2—2 of Figure 3, Figure 3 is a plan view of the solenoid piston structure a portion of which has been broken away, and Figure 4 is a sectional view of the solenoid structure as viewed along the lines 4—4 of Figure 2.

Referring to Figure 1 in which a portion of an airplane is shown diagrammatically in elevation, the numeral 6 generally designates an engine of the liquid cooled type for driving a propeller 7. The engine 6 is cooled by a suitable fluid, such as Prestone, which is circulated through the engine and a radiator 8, the radiator being connected to the engine by suitable conduit 9, 10 in the usual manner.

The fluid in the radiator 8 is cooled by the passage of air therethrough, and the amount of cooling is controlled by a pair of scoops 11, 12 which are pivotally mounted on the cowl 13 of the airplane in such a manner as to be pivotally adjustable outwardly of the cowl. The front scoop 11 admits the air which flows through the radiator 8 in the direction of the arrows and the rear scoop 12 serves as a discharge port for the air as clearly seen in the drawing.

A reversible hydraulic servo-motor 14, of conventional design is provided for adjusting the scoops 11, 12. The motor 14 comprises a cylinder 15 and a piston 16 mounted for reciprocative movement in the cylinder. A piston rod 17 is secured to the piston 16 and extends through an end of the cylinder 15 in fluid tight relation therewith.

The piston rod 17 carries a transverse pin 18 by means of which the rod makes a driving connection with a slotted arm 19 of a bell crank 20. One arm of the bell crank 20 is connected to the scoop 11 by a link 21, and the other arm is connected to a first arm of a second bell crank 22 by a link 23. The other arm of bell crank 22 is connected by a link 24 to scoop 12. With the above bell crank arrangement, it is obvious that both scoops 11, 12 may be adjusted to the same extent for each movement of the piston 16.

Fluid for operating the motor 14 is supplied by a low pressure receiver or sump 25. The fluid is drawn from the sump through conduit 26 to the pump and pressure chamber 27 and thence supplied under pressure through conduit 28 to a solenoid actuated control valve generally designated 29. Conduit 30 is provided for the return of low pressure fluid from the valve 29 to the sump 26. Also leading from the valve 29 are conduits 31, 32 which communicate with the left and right ends of the cylinder 14 respectively.

The valve 29 is provided with a pair of electric terminals 33, 34 and may be grounded to the airplane structure in any convenient manner being schematically grounded through grounded connections 35 as shown in the drawing. As will hereinafter appear, when a circuit is completed through the terminal 33 to ground, the valve 29 provides a fluid flow causing the piston 16 to move to the left. When a circuit is completed through the terminal 34 to ground the valve 29 provides a fluid flow causing the piston 16 to move to the right. Upon deenergization of the valve 29 all of the ports leading therefrom are automatically closed thereby hydraulically locking the piston 16 in its adjusted position.

It is to be understood that any convenient means may be employed for controlling the energization of the valve 29. Such means may comprise manually controlled switch means disposed at the pilot's station, or automatic means responsive to engine temperature which may, for example, be a three wire temperature control system or a follow-up control system of the balanced circuit or bridge type.

In the drawing a bridge circuit, generally designated by the numeral 36, is shown as best being illustrative of the principles involved in my invention. The bridge circuit 36 comprises a temperature responsive resistance element 37 which is preferably inserted into the conduit 9 at the point where the hot fluid leaves the engine, as shown. The circuit 36 further comprises input terminals 38, 39, and output terminals 40, 41.

A first arm of the bridge circuit 36 includes the temperature responsive element 37 which is connected between the input terminal 38 and output terminal 40. The second arm of the bridge circuit is connected between the output terminal 40 and the input terminal 39 and includes a fixed resistor 42. The third arm of bridge circuit 36 is connected between input terminal 38 and output terminal 41 and includes a fixed resistor 43, a conductor 44, that portion of a slide wire resistor 45 between its right hand terminal and its cooperating slider 46, and slider 46. The fourth arm of the bridge circuit 36 includes slider 46, that portion of slide wire resistor 45 between its left hand terminal and the slider 46, a variable resistor 47, and a conductor 48, the fourth arm being connected between the output terminal 41 and the input terminal 39. Slide wire 45 and slider 46 comprise a rebalancing potentiometer for the bridge circuit 36, the slider 46 being operatively connected to the piston rod 17, as shown, to provide a follow-up function. The purpose of resistor 47 is to provide means for adjusting the control point of the system. Adjustment of the resistor 47 determines that temperature of the fluid in conduit 9 adjacent to element 37 which causes the bridge circuit 36 to be balanced for a given position of the slider 46 with respect to the slide wire 45. A variable resistor 49 and conductor 50 are connected in parallel with the conductor 44 and slide wire resistor 45. The purpose of resistor 49 is to provide means for regulating the amount of movement of slider 46 necessary to correct a given unbalance of the bridge circuit 36.

Bridge input terminals 38, 39 are connected to a transformer secondary winding 51 through conductors 52, 53 respectively. Bridge output terminal 40 is connected to an input terminal 54 of an electronic amplifier 55 through a conductor 56. Amplifier 55 may be of any desired type but is preferably of the type disclosed in Figure 2 of the copending application of Albert E. Upton, Serial No. 437,561 filed April 3, 1942. Output terminal 41 of bridge circuit 36 is connected through ground connections 57 and 58 to amplifier input terminal 59.

Amplifier 55 has a pair of power supply terminals 60 and 61 which are connected to a transformer secondary winding 62 through conductors 63, 64, and a pair of selectively energizable output terminals 65 and 66. Input terminal 59, through ground connections 58, serves as a common return terminal for the output terminals 65 and 66.

Output terminal 65 is connected through a conductor 67, a winding 68 of a relay 69, a conductor 70, one-half of transformer secondary winding 71, and a conductor 72 to ground at 73.

Output terminal 66 is connected through a conductor 74, a winding 75 of a relay 76, a conductor 77, the other half of transformer secondary winding 71 and thence through conductor 72 to ground at 73.

Transformer secondary windings 51, 62 and 71 comprise parts of a transformer generally designated by the numeral 78. Transformer 78 further comprises a primary winding 79 which is supplied with alternating current by means of an inverter 80 of any well-known type. The inverter is supplied with direct current from a battery 81 through conductors 82, 83.

The negative side of the battery 81 is grounded through connections 84. The positive side of the battery is connected through a conductor 85 with movable contacts 86 and 87 of relays 69 and 76, respectively. The fixed contacts 88 and 89 of relays 69 and 76 are connected through conductors 91 and 90 with terminals 34 and 33, respectively, of control valve 29.

When the relays 69, 76 are deenergized, the contacts 86, 88 and 87, 89 assume the open position, as seen in the drawing, by any suitable means such as spring return means. When the relay 69 is energized, a plunger 92 drives the contact 86 into engagement with the contact 88, and when the relay 76 is energized, a plunger 93 drives the movable contact 87 into engagement with the contact 89.

Referring now to Figures 2, 3, and 4 in which the control valve 29 is shown in detail, it is seen that the valve comprises a valve body 94 having a longitudinal bore 95 which is threaded on the left end to receive the conduit 30. The valve body 94 is further provided with transverse bores 96, 97, 98 which communicate with the bore 95 and are threaded to receive the conduits 28, 31, 32 respectively. The bores 97 and 98 will hereinafter be referred to as control ports, the bore 95 is an outlet port and the bore 96 is an inlet port.

Mounted in the bore 95 for reciprocative movement therein is a piston 99 which is provided with three peripheral grooves 100, 101, 102 which are associated with the control port 98, inlet port 96, and control port 97 respectively in a manner to close the same when the piston 99 is in the position shown in Figure 2. The arrangement of the grooves 100, 101, 102 is such that when the valve 99 is moved sufficiently far to the left so that the groove 101 lies adjacent the port 98 the port 96 is still in communication with the groove 101. Accordingly, with the piston 99 in this position, fluid communication between the inlet port 96 and control port 98 is established. Similarly, when the piston 99 is moved sufficiently far to the right so that the groove 101 lies adjacent the port 97 the groove 101 is still adjacent the port 96 to establish fluid communication between the inlet port 96 and the control port 97. It is to be noted that the bores 96, 97, 98 are considerably reduced at the points adjacent to the bore 95. Since the fluid in port 96 is under pressure and since any attempt toward movement of the piston 16 of servo-motor 14 when the piston 99 is in the position shown places the fluid in ports 97 and 98 under pressure, the curvature of the grooves cooperates with the small section of the ports to center and maintain the centering of the piston 99 in the position shown without introducing side thrust between the plunger and the bore.

The right end of piston 99 is reduced in diameter and is provided with a transverse bore 103. A second bore 104 in piston 99 extends longitudinally thereof into communication with the transverse bore 103. Thus, with this arrangement, when the piston 99 is moved to its position on the left, as pointed out above, fluid flows from port 96, through port 98 to servo-motor 14 and thence from motor 14 through port 97, bores 103 and 104, and port 95 to sump 25. When the piston 99 is moved to its position on the right it moves sufficiently far such that the right end of the piston clears the port 98. The port 98 thus communicates directly with the port 95 and the fluid from servo-motor 14 flows directly through ports 98 and 95 to sump 25.

The valve body 94 is formed with a flange 105 which is reduced and threaded to receive a cup-shaped solenoid housing 106 in fluid tight relation therewith. The housing 106 is formed with a hexagonal section, as seen in Figures 3 and 4, to facilitate its assembly to the valve body 94. The flange 105 is formed concentrically with respect to the bore 95. Accordingly, the housing 106 extends axially of the bore 95.

Telescopingly received within the housing 106 is a solenoid assembly comprising magnetic end discs 107, 108 having inwardly facing shoulders upon which is mounted a non-magnetic sleeve 109. Mounted on the sleeve 109 midway between the discs 107, 108 and also in engagement with the housing 106 is a magnetic washer 110. Disposed between the washer 110 and discs 107, 108 are a pair of solenoid windings 111, 112 respectively, the windings being insulated from the washer and discs by suitable insulation washers 113. The windings are directly wound upon the sleeve 109 and grounded thereto, as indicated at 114.

A lead 116 of winding 111 is brought out through an aperture in disc 107 to terminal 33, and a lead 115 of winding 112 is brought out through apertures in washer 110 and disc 107 to terminal 34. Terminals 33, 34 extend through insulation sleeves 117, 118 which in turn extend through apertures 119, 120 formed in housing 106. Insulation washers 121, 122 insulate the conductors 90, 91 from the housing 106, the conductors and terminal assembly being secured by binding nuts 123.

Mounted in the sleeve 109 for cooperation with the windings 111, 112 is a magnetic plunger 124 which is tapered at the ends to engage tapered counterbores 125, 126 in the discs 107, 108. The discs 107, 108 serve as stops to limit movement of the plunger 124 which drives the piston 99. As pointed out hereinabove, the movement of the piston is limited to provide the desired control of the fluid through the valve.

In order to prevent a dash-pot action as the plunger 124 moves into the counterbores 125, 126, a longitudinal bore 127 is provided in the plunger. When the winding 111 is energized, a flux path is set up in the plunger 124, disc 107, housing 106 and washer 110 back to plunger 124 by virtue of which the plunger is drawn into engagement with the disc 107. Similarly, when the winding 112 is energized, a flux path is set up in the plunger 124, disc 108, housing 106 and washer 110 back to the plunger 124 by virtue of which the plunger is drawn into engagement with the disc 108.

A rod 128 which extends through the disc 107 is secured at the right end to the plunger 124 and carries a U-shaped coupling member 129 on the left end. The free end of member 129 is bifurcated in such a manner as to be receivable in a groove 130 in the piston 99 upon lateral movement of the valve body and solenoid assembly relative to each other before the valve body is screwed to the housing 106 which greatly facilitates the assembly of the valve 29. Moreover, it is apparent that the coupling arrangement described permits freedom of movement of the plunger and piston independently of the movement of each with respect to its support.

The rod 128 has a shoulder 131, and loosely mounted on the rod between the shoulder and member 129 are a pair of washers 132, 133. The washers are provided with inwardly facing shoulders upon which are supported a coil spring 134. The washer 132 abuts against the valve body 94 and the washer 133 abuts against the disc 107. Accordingly, the spring 134 is held in compression between the washers 132, 133. When the winding 111 is energized, the plunger rod 128 and washer 133 move to the left, causing further compression of the spring 134 which upon deenergization returns the parts to the position shown. Similarly, when the winding 112 is energized, the plunger, rod 128, and washer 132 move to the right, causing further compression of spring 134 which returns the parts to the position shown upon deenergization of winding 112.

It is to be noted that the fluid is free to circulate through the solenoid assembly which serves to cool the windings 111, 112 as well as provides a means of lubrication for the moving parts.

The amplifier 55 is so constructed that when an alternating signal of a predetermined phase is applied to the input terminals 54 and 59, that branch of the output circuit extending through output terminal 65 and relay 69 is energized. When an alternating current signal of the opposite phase is applied to input terminals 54 and 59, the other branch of the output circuit, including terminal 66 and relay 76 is energized. It will, therefore, be apparent that the relays 69 and 76 are selectively energized in accordance with the direction of unbalance of the bridge circuit 36.

In operation, with the parts in the position shown in the drawing, the scoops 11, 12 are half way open and the engine 6 is at the desired temperature. Let it be assumed that the temperature adjacent the temperature responsive element 37 increases above the desired value. This increases the resistance between input terminal 38 and output terminal 40 of bridge circuit 36 which unbalances the bridge in such a direction that an alternating potential is applied to amplifier 55 with the proper phase relationship to cause energization of the relay winding 76. Energization of relay winding 76 causes contact 87 to move into engagement with contact 89, thereby completing an energizing circuit for winding 111 which may be traced as follows: from battery 81, through conductor 85, contacts 87, 89, conductor 90, terminal 33, lead 116, winding 111, and thence through ground connections 114, 35 and 84 back to battery 81. Plunger 124 and piston 99 then move to the left, whereupon communication between ports 96 and 98 and ports 97 and 95 is established. Fluid then flows from the sump 25 through conduit 26 to the pump and pressure chamber 27, thence through conduit 28, ports 96, 98, conduit 32, cylinder 15, conduit 31, port 97, bores 103, 104, port 95, and conduit 30 back to the sump 25. Upon such movement of the fluid, piston 16 is moved to the left which drives the scoops in a direction to open the same. Movement of piston 16 also drives the slider 46 to the left thereby increasing the resistance between bridge input terminal 38 and output terminal 41, to balance the increased resistance between input terminal 38 and output terminal 40 due to the increase in engine temperature. When the bridge is again balanced, the relay 76 is deenergized and winding 111 is deenergized upon opening of the contacts 87, 89. The piston 99 and plunger 124 therefore return to their positions as seen in Figure 2 under the power of spring 134. With the piston 99 in this position, the piston 16 is hydraulically locked against further movement, and because of the noncompressible nature of the fluid, the scoops are securely held in the adjusted position.

If the engine temperature decreases below the value it is desired to maintain, the bridge 36 is unbalanced in the opposite direction, thereby causing energization of winding 68 of relay 69. Energization of relay 69 causes the engagement of contacts 86, 88 thereby completing a circuit to winding 112 which may be traced as follows: from battery 81 through conductor 85, contacts 86, 88, conductor 91, terminal 34, lead 115, winding 112, and through ground connections 114, 35, and 84 back to battery 81. Upon energization of winding 112, plunger 124 and piston 99 move to the right whereupon ports 96 and 97 and ports 98 and 95 are in communication. Fluid then flows from sump 25 through conduit 26, pump 27, conduit 28, ports 96, 97, conduit 31, cylinder 15, conduit 32, ports 98, 95, and conduit 30 back to sump 25. Movement of the fluid causes piston 16 to move to the right which moves the scoops 11, 12 in a direction to close the same. The movement of piston 16 ceases upon sufficient movement of the slider 46 to again balance the bridge 36 which in turn deenergizes the relay 69 to open the circuit to the winding 112. Upon deenergization of winding 112 the plunger 124 and piston 99 return to their positions as shown under the power of spring 134. Fluid flow through the valve 29 is then cut off which again hydraulically locks the scoops 11, 12 in position.

While I have shown and described but one embodiment of my invention I contemplate all such further embodiments and structural modifications thereof as would naturally occur to those skilled in the art without departing from the spirit of the invention as defined by the appended claims.

I claim as my invention:

1. A solenoid valve, comprising, in combination, a valve body having a longitudinal bore, a piston valve having a neutral center position in said bore, a solenoid housing detachably secured to said valve body, a solenoid in the housing and spaced from said valve body, a plunger operably disposed in said solenoid substantially axially of said piston valve, said plunger having a neutral center position, a driving connection joining said plunger and said piston, said driving connection including a rod having one end thereof fixed to said plunger, a U-shaped member having one leg thereof fixed to the other end of said rod, the other leg of said U-shaped member being operably associated with said piston valve to permit limited relative movement of said plunger and said piston, a shoulder formed on the intermediate portion of said rod, and a centering spring fixed on said rod intermediate said shoulder and said U-shaped member and operably associated with opposed surfaces of said solenoid and said body for yieldably resisting axial movement of said piston valve and said plunger from their center positions, said spring and rod arrangement permitting the free movement of said plunger from its center position to facilitate jointing said piston valve to said U-shaped member.

2. A solenoid valve, comprising, in combination, a valve body having a longitudinal bore, a piston valve having a neutral center position in said bore, a solenoid housing detachably secured to said valve body, a solenoid in the housing and spaced from said valve body, a plunger operably disposed in said solenoid substantially axially of said piston valve, said plunger having a neutral center position, a driving connection detachably jointing said plunger and said piston valve and permitting limited relative movement there between, a centering spring fixed to said driving connection and functioning to normally maintain said plunger and said piston valve in centered positions when said valve body and said solenoid housing are assembled, said fixed spring permitting said plunger to depart from centered positions when said body and said housing are disassembled.

3. In a solenoid valve, comprising in combination, a valve body having a bore therein, a piston valve operably positioned within said bore, said piston valve having a center neutral position, a solenoid housing detachably secured to said valve body, a solenoid positioned in said housing and spaced from said body, a plunger operably positioned within said solenoid substantially axially of said piston valve, said plunger having a center neutral position, connection means for detachably securing said plunger to said piston valve, spring means secured to said connection means and operable upon the assembly of said valve body and said solenoid to yieldably resist movement of said plunger and said piston valve from their centered neutral positions, said spring means being disposed to permit free movement of said plunger from its centered neutral position upon disassembly of said housing and said body.

4. In a solenoid valve, comprising in combination, a valve body having a longitudinal bore therein, a piston valve operably positioned within said bore, said piston valve having a centered neutral position, a solenoid housing detachably secured to said valve body, a solenoid positioned in said housing and spaced from said body, a plunger operably positioned within said solenoid substantially axially of said piston valve, said plunger having a centered neutral position, connection means for detachably securing said plunger to said piston valve, spring means fixed to said connection means and operable upon the assembly of said solenoid valve to move said piston valve and said plunger into their centered neutral positions, said spring means being operable in conjunction with portions of the assembled solenoid and valve body for yieldably resisting movement of said piston valve and said plunger from their centered neutral positions, said spring means being ineffective to maintain said plunger in centered neutral position when said solenoid housing is separated from said valve body, and means for maintaining said plunger within said solenoid when said parts are so separated.

5. A solenoid valve, comprising in combination, a valve body having a longitudinal bore and a piston valve in the bore, a pair of adjacent solenoids disposed axially of the piston, means for maintaining the valve body and solenoids in spaced relation, said means including a solenoid housing detachably secured to said body, a plunger operatively associated with said solenoid, a driving connection between said plunger and piston detachably secured to one of said members, means fixed to the driving connection and disposed between the solenoid and valve body for automatically centering the piston and plunger upon assembly of the housing and body and for yieldably maintaining the plunger centrally of the solenoid when the same are deenergized, said fixed centering means permitting free longitudinal movement of said plunger to facilitate assembly of the piston therewith when said solenoid housing is removed from said valve body, and stop means for limiting longitudinal movement of said plunger.

HUBERT T. SPARROW.